United States Patent
Hahn et al.

(10) Patent No.: US 10,045,333 B2
(45) Date of Patent: Aug. 7, 2018

(54) METHOD FOR UPDATING TERMINAL-CENTERED COVERAGE

(71) Applicant: LG ELECTRONICS INC., Seoul (KR)

(72) Inventors: Genebeck Hahn, Seoul (KR); Heejeong Cho, Seoul (KR); Jaehoon Chung, Seoul (KR); Eunjong Lee, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 15/035,175

(22) PCT Filed: Nov. 7, 2014

(86) PCT No.: PCT/KR2014/010682
§ 371 (c)(1),
(2) Date: May 6, 2016

(87) PCT Pub. No.: WO2015/069057
PCT Pub. Date: May 14, 2015

(65) Prior Publication Data
US 2016/0295572 A1    Oct. 6, 2016

Related U.S. Application Data

(60) Provisional application No. 61/901,001, filed on Nov. 7, 2013.

(51) Int. Cl.
*H04W 72/04* (2009.01)
*H04W 76/10* (2018.01)
(Continued)

(52) U.S. Cl.
CPC ....... *H04W 72/0413* (2013.01); *H04W 16/32* (2013.01); *H04W 24/10* (2013.01);
(Continued)

(58) Field of Classification Search
CPC ..... H04W 16/32; H04W 24/10; H04W 28/02; H04W 76/02; H04W 28/16;
(Continued)

(56) References Cited

U.S. PATENT DOCUMENTS

2012/0224541 A1*  9/2012  Yoshiuchi ............. H04W 16/10
                                                   370/329
2014/0036822 A1*  2/2014  Maeda; Miho ....... H04W 72/04
                                                   370/329
(Continued)

FOREIGN PATENT DOCUMENTS

EP    2611229        7/2013
JP    2013223070     10/2013
(Continued)

OTHER PUBLICATIONS

PCT International Application No. PCT/KR2014/010682, Written Opinion of the International Searching Authority dated Feb. 11, 2015, 18 pages.

*Primary Examiner* — Charles C Jiang
*Assistant Examiner* — Kyaw Z Soe
(74) *Attorney, Agent, or Firm* — Lee, Hong, Degerman, Kang & Waimey

(57) ABSTRACT

Disclosed is a coverage setting method comprising detecting the generation of uplink data which is to be transmitted through uplink communication; transmitting an uplink data generation notification message for requesting an update of an uplink coverage to a BBU mapped to an RRU, if the uplink data is not capable of being transmitted by the RRU due to a state of the RRU being connected to a terminal, receiving, from the BBU, an RRC connection resetting message for indicating an addition of a connection with a
(Continued)

new RRU for performing the uplink communication when it is determined that the uplink coverage of the terminal is to be updated by the BBU, and setting the connection with the new RRU to transmit the uplink data.

10 Claims, 8 Drawing Sheets

(51) Int. Cl.
   *H04W 16/32* (2009.01)
   *H04W 24/10* (2009.01)
   *H04W 28/02* (2009.01)
   *H04W 28/16* (2009.01)
   *H04W 88/08* (2009.01)

(52) U.S. Cl.
   CPC ....... *H04W 28/0278* (2013.01); *H04W 28/16* (2013.01); *H04W 76/10* (2018.02); *H04W 72/04* (2013.01); *H04W 88/085* (2013.01)

(58) Field of Classification Search
   CPC ......... H04W 28/0278; H04W 72/0413; H04W 72/04; H04W 88/085
   See application file for complete search history.

(56) References Cited

U.S. PATENT DOCUMENTS

| | | | | |
|---|---|---|---|---|
| 2014/0226576 A1* | 8/2014 | Gupta | ................... | H04W 56/00 370/329 |
| 2014/0226736 A1* | 8/2014 | Niu | ..................... | H04L 27/2628 375/260 |
| 2015/0087324 A1* | 3/2015 | Ishida | ................... | H04W 16/00 455/452.2 |
| 2015/0237571 A1* | 8/2015 | Laraqui | ................ | H04W 48/20 370/332 |
| 2016/0057797 A1* | 2/2016 | Bangolae | .......... | H04W 52/0209 370/311 |

FOREIGN PATENT DOCUMENTS

| | | | | |
|---|---|---|---|---|
| WO | WO 2009151355 A1 * | 12/2009 | ............ | H04W 36/30 |
| WO | 2013086410 | 6/2013 | | |
| WO | 2013123670 | 8/2013 | | |
| WO | 2013125919 | 8/2013 | | |

\* cited by examiner

METHOD FOR UPDATING TERMINAL-CENTERED COVERAGE

CROSS-REFERENCE TO RELATED APPLICATIONS

This application is the National Stage filing under 35 U.S.C. 371 of International Application No. PCT/KR2014/010682, filed on Nov. 7, 2014, which claims the benefit of U.S. Provisional Application No. 61/901,001, filed on Nov. 7, 2013, the contents of which are all hereby incorporated by reference herein in their entirety.

TECHNICAL FIELD

The present invention relates to a method for updating user equipment-centered coverage in an environment that RRU and BBU are provided separately from each other and a user equipment for performing the method.

BACKGROUND ART

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network. A new RAN configuration is used to enhance quality of experience (QoE) by providing a high data transmission rate to a last user.

In small cell enhancements for E-UTRA and E-UTRAN study item (SI) as one of $3^{rd}$ generation partnership project (3GPP) standard scopes, research has been ongoing into enhancement of indoor/outdoor scenarios using low power nodes, and the scenarios is described in TR 36.932. In small cell enhancements for E-UTRA and E-UTRAN SI, research has been conduced to draw advantages of concept of dual connectivity to small cell layers and a macro cell layer in which a user uses the same or different carriers.

Considering this trend, a huge number of small cells will be deployed and thus UEs will get nearer to a network physically. Accordingly, it is expected that not conventional physical cell-based communication but communication through UE-centered zones will be conducted in a future-generation wireless access network. To implement communication through UE-centered zones to increase capacity, technical issues to realize a service providing unit such as a UE-centered zone differentiated from a physical cell-based service providing unit should be derived and solved, which will greatly affect a current RAN.

DETAILED DESCRIPTION OF THE INVENTION

Technical Problem

The present invention has been devised to solve the aforementioned technical problem, and an object of the present invention is to provide optimal connectivity to a user equipment by allowing the user equipment to perform communication by updating user equipment-centered coverage.

Another object of the present invention is to provide an efficient service to a user by forming asymmetric coverage by distinguishing uplink coverage from downlink coverage.

Still another object of the present invention is to provide a service by considering a user traffic characteristic change and a status change of a radio channel.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the technical problems, a method for updating a coverage comprises the steps of detecting an occurrence of an uplink data which will be transmitted through an uplink communication; transmitting, when the uplink data cannot be transmitted by an RRU connected to a UE due to a state of the RRU, an uplink data occurrence notifying message for requesting an update of an uplink coverage to a BBU mapped with the RRU; receiving, from the BBU, an RRC connection reconfiguration message for indicating an addition of a connection with a new RRU for performing the uplink communication as it is determined that the uplink coverage of the UE is to be updated by the BBU; and configuring a connection with the new RRU to transmit the uplink data.

The state of the RRU may be a case that a radio access technology (RAT) matched with traffic attributes of the uplink data is not supported by the RRU, a case that it is determined that efficiency of a RAT supported by the BBU for the traffic attributes of the uplink data is low, or a case that bearer capacity supported by the RRU is exceeded in accordance with the occurrence of the uplink data.

The matching relation between the traffic attributes and the RAT is determined with reference to a mapping table generated by the BBU or a mobility management entity (MME) of a network, the mapping table being generated UE-specifically based on at least one of preference of the UE and a statistic value and transmitted to the UE.

A method for configuring a coverage may include periodically receiving downlink signals from RRUs other than the RRU connected to the UE, and transmitting, to the BBU, a measurement report message, which includes information on an RRU, in which the downlink signal is received at strength of a threshold value or more, among the RRUs other than the RRU connected to the UE.

The new RRU is determined based on the measurement report message received by the BBU from the UE, and an RRU, which may provide a best radio quality to the UE is selected as the new RRU among RRUs detected by the UE.

The RRC connection reconfiguration message may include at least one of information on the new RRU, information of RAT supported by the new RRU, attribute information of the new RRU, and information indicating additional measurement of the new RRU.

The uplink data occurrence notifying message is embodied by a buffer status report (BSR) message or a non access stratum (NAS) message, and may include information of RAT required for the uplink data.

The RRC connection reconfiguration message includes information on a new BBU mapped to the new RRU when the new RRU is not mapped to the BBU which is mapped with the RRU connected to the UE and performs communication with the UE, and the BBU transmits a UE information deliver message, which requests a support of the UE, to the new BBU.

To solve the technical problems, a UE comprises a transmitter; a receiver; and a processor connected with the transmitter and the receiver and operated to configure the UE-centered coverage, wherein the processor detects an occurrence of an uplink data which will be transmitted through an uplink communication, controls the transmitter to transmit when the uplink data cannot be transmitted by an RRU connected to a UE due to a state of the RRU, an uplink data occurrence notifying message for requesting an update of an uplink coverage to a BBU mapped with the RRU, controls the receiver to receive, from the BBU, an RRC connection reconfiguration message for indicating an addition of a connection with a new RRU for performing the uplink communication as it is determined that the uplink coverage of the UE is to be updated by the BBU, and configures the connection with the new RRU to transmit the uplink data.

To solve the technical problems, another method for updating a coverage comprises the steps of receiving, from the UE, an uplink data occurrence notifying message indicating that an uplink data have occurred but cannot be transmitted through an RRU connected to the UE; determining to update an uplink coverage configured for the UE; transmitting, to the UE, an RRC connection reconfiguration message indicating an addition of a connection with a new RRU to allow the UE to transmit the uplink data; and receiving an RRC connection complete message in response to the RRC connection reconfiguration message.

To solve the technical problems, a baseband unit (BBU) comprises a transmitter; a receiver; and a processor connected with the transmitter and the receiver and operated to configure the UE-centered coverage, wherein the processor controls the receiver to receive, from a UE, an uplink data occurrence notifying message indicating that an uplink data have occurred but cannot be transmitted through an RRU connected to the UE, determines to update an uplink coverage configured for the UE, controls the transmitter to transmit, to the UE, an RRC connection reconfiguration message indicating an addition of a connection with a new RRU to allow the UE to transmit the uplink data, and controls the receiver to receive an RRC connection complete message in response to the RRC connection reconfiguration message.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects may be expected.

First of all, as user equipment-centered coverage not a cell-based network of the related art is formed, optimal connectivity may be provided to a user in an environment that a small cell and a macro cell coexist.

Second, uplink connection and downlink connection may be configured separately, whereby efficient resource distribution may be performed.

Thirdly, since user-centered coverage may be configured and updated considering a time variable status in the periphery of a user and a time variable status of a network, an optimal service may be provided to a user.

It will be appreciated by persons skilled in the art that that the effects that can be achieved through the present invention are not limited to what has been particularly described hereinabove and other advantages of the present invention will be more clearly understood from the following detailed description. That is, effects which are not intended in carrying out the present invention may be devised from the embodiments of the present invention by the person with ordinary skill in the art.

BRIEF DESCRIPTION OF THE DRAWINGS

The accompanying drawings, which are included to provide a further understanding of the invention, illustrate embodiments of the invention and together with the description serve to explain the principle of the invention. Reference numerals in each drawing mean structural elements.

BEST MODE FOR CARRYING OUT THE INVENTION

Figure 1:
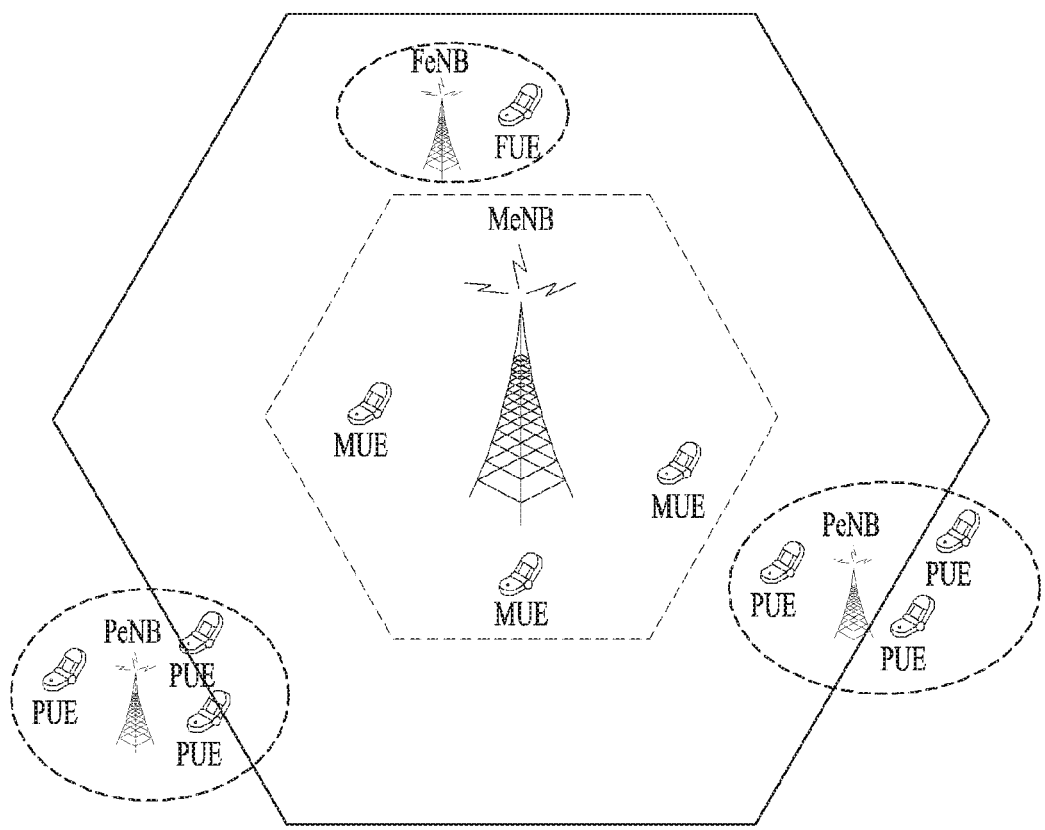
FIG. 1 is a diagram illustrating a heterogeneous network environment according to one embodiment of the present invention.

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. It will be understood that when an element is referred to as being "connected to" or "coupled to" another element, the terms may include physical connection as well as physical connection and may also refer to logical connection. The term '-unit', '-or(er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS), 'terminal', etc. In particular, the MS can have the same meaning as an M2M device.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Deployment

FIG. 1 illustrates a heterogeneous network wireless deployment according to the present invention.

To guarantee a more stable data service such as multimedia service in future-generation mobile communication, much attention has been attracted to a hierarchical cell structure or heterogeneous cell structure in which micro cells (pico cells or femto cells) are co-located within a macro cell-based homogeneous network. This is because installation of additional macro eNode Bs is inefficient in terms of cost and complexity relative to system performance improvement.

A heterogeneous network configuration under consideration for a future-generation communication network may be established as illustrated in FIG. 1. A plurality of small cells may coexist in one macro cell and each serve corresponding UEs by resource allocation based on cell coordination. As one of core technologies for the aforementioned heterogeneous network deployment, a remote radio unit (RRU) and a baseband unit (BBU) can be separated from each other.

2. C-RAN Deployment in which RRU and BBU are Separated

Figure 2:
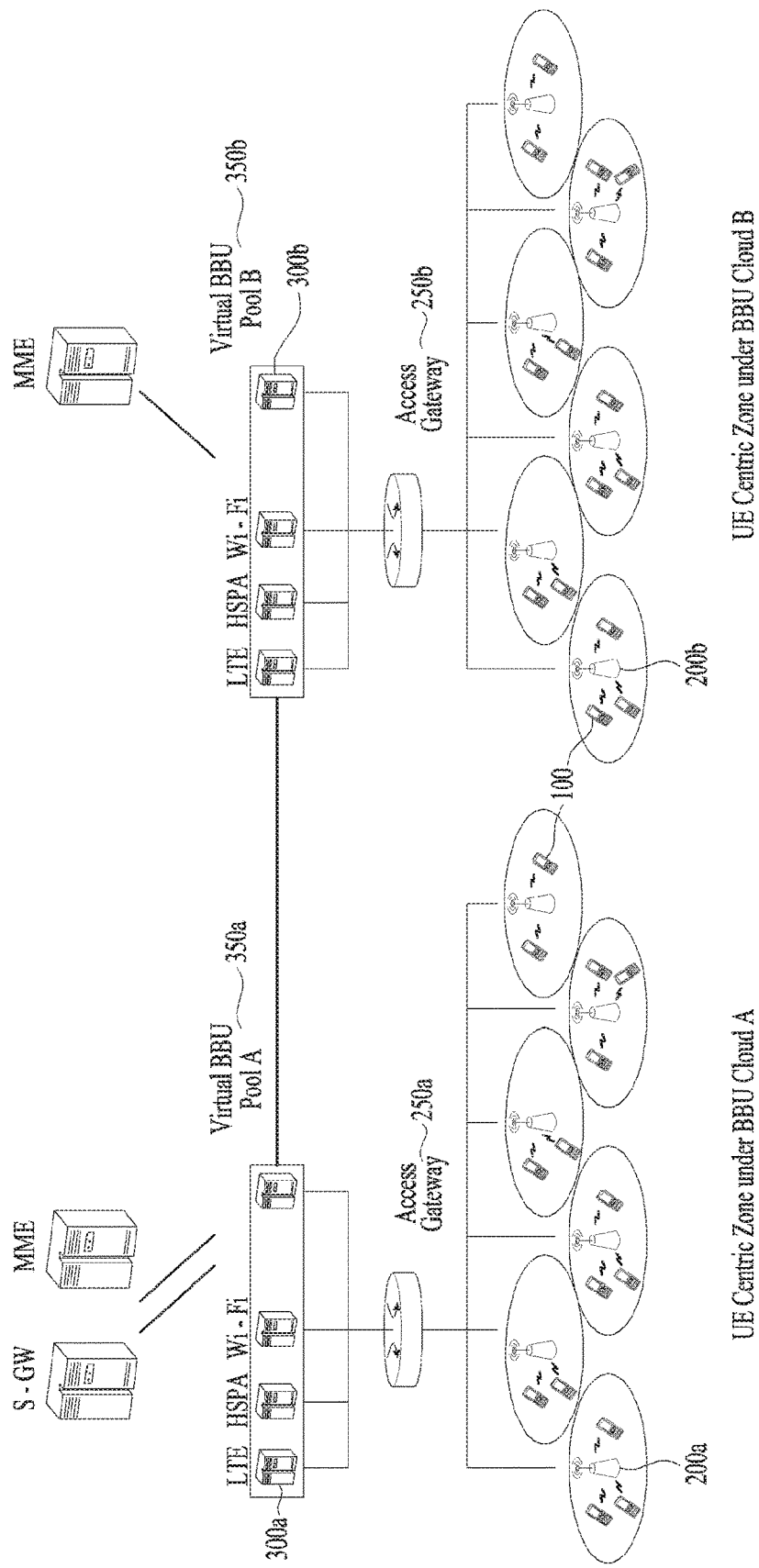
FIG. 2 is a diagram illustrating a cloud radio access network (C-RAN) environment according to one embodiment of the present invention.

FIG. 2 is a diagram illustrating a cloud radio access network (C-RAN) deployment according to an embodiment of the present invention. The C-RAN deployment may include a plurality of RRUs 200a and 200b and software-based virtual BBU pools 350a and 350b or a virtual base station (VBS) and access control/resource management/authentication servers for controlling them, etc. In the C-RAN deployment, as elements of a core network are changed to an open-type IP network, various elements of the C-RAN are connected directly to the elements of the core network with an organic relation therebetween.

An example of the C-RAN deployment may include deployment in which the plural RRUs 200a and 200b and the BBUs 300a and 300b are separated from each other, as described above. Since the RRUs and the BBUs are separated from each other, C-RAN deployment having the following characteristics may be achieved.

First, the virtual BBU pools 350a and 350b are present and include the plural BBUs 300a and 300b, respectively. The virtual BBU pools 350a and 350b have structures associated with shared antenna system (SAS) RRUs 200a and 200b for supporting multi radio access technology (Multi-RAT) through an access gateways (GWs) 250a and 250b, respectively. The virtual BBU pools 350a and 350b may include the plural BBUs 300a and 300b for supporting various RATs, respectively. One of the RRUs 200a and 200b may be associated with one or more BBUs 300a and 300b, respectively, and on the other hand, one of the BBU 300a and 300b may be associated with one or more RRU 200a and 200b. The BBUs 300a and 300b in the virtual BBU pools 350a and 350b may be connected to the RRUs 200a and 200b and ideal/non-ideal backhaul. One virtual BBU pool 350a may be connected to another virtual BBU pool 350b through an X2 interface or a similar interface.

Second, the RRUs 200a and 200b in the virtual BBU pools 350a and 350b have the same virtual cell ID, and all the BBUs 300*a* and 300*b* and all the RRUs 200*a* and 200*b* in the virtual BBU pools 350*a* and 350*b* are connected via ideal backhaul such that the RRUs 200*a* and 200*b* are controlled by the BBUs 300*a* and 300*b* that are associated with the RRUs 200*a* and 200*b*.

Third, sync signals used for acquisition of downlink synchronization may be transmitted to the RRUs 200*a* and 200*b* and may include RRU IDs for distinguishing the RRUs 200*a* and 200*b* as well as virtual cell IDs representing the virtual BBU pools 350*a* and 350*b* to which the RRUs 200*a* and 200*b* belong.

Fourth, each of the RRUs 200*a* and 200*b* assumes a simple antenna and L1/L2/L3 layer processing is performed by the BBUs 300*a* and 300*b* present in the virtual BBU pools 350*a* and 350*b*. In addition, the RRUs 200*a* and 200*b* have the attribute of SAS, which means that the RRUs 200*a* and 200*b* can change their attachments from one BBU in the virtual BBU pools 350*a* and 350*b* to another BBU, respectively. That is, time-variant attachment of the RRUs 200*a* and 200*b* may be changed from one BBU to another BBU according to a situation of the BBUs 300*a* and 300*b* (e.g., load, resource situation, etc. of a BBU).

Conventionally, physical cells are present and UEs access the cells to receive a service. However, as described above, when an RRU and a BBU are separated from each other, a zone in which a network can provide an optimal communication environment in user units can be established so as to provide a service based on the corresponding zone.

3. Method for Updating Coverage

Hereinafter, a method for updating UE-centered coverage for network access of a UE in the aforementioned cloud RAN environment will be described. Update of UE-centered coverage means that a network configures a zone for providing an optimal communication environment in a user unit, and also means that a zone based on a UE is configured unlike a cell concept of the related art (that is, formation of a relation with a UE based on a base station).

Figure 3:
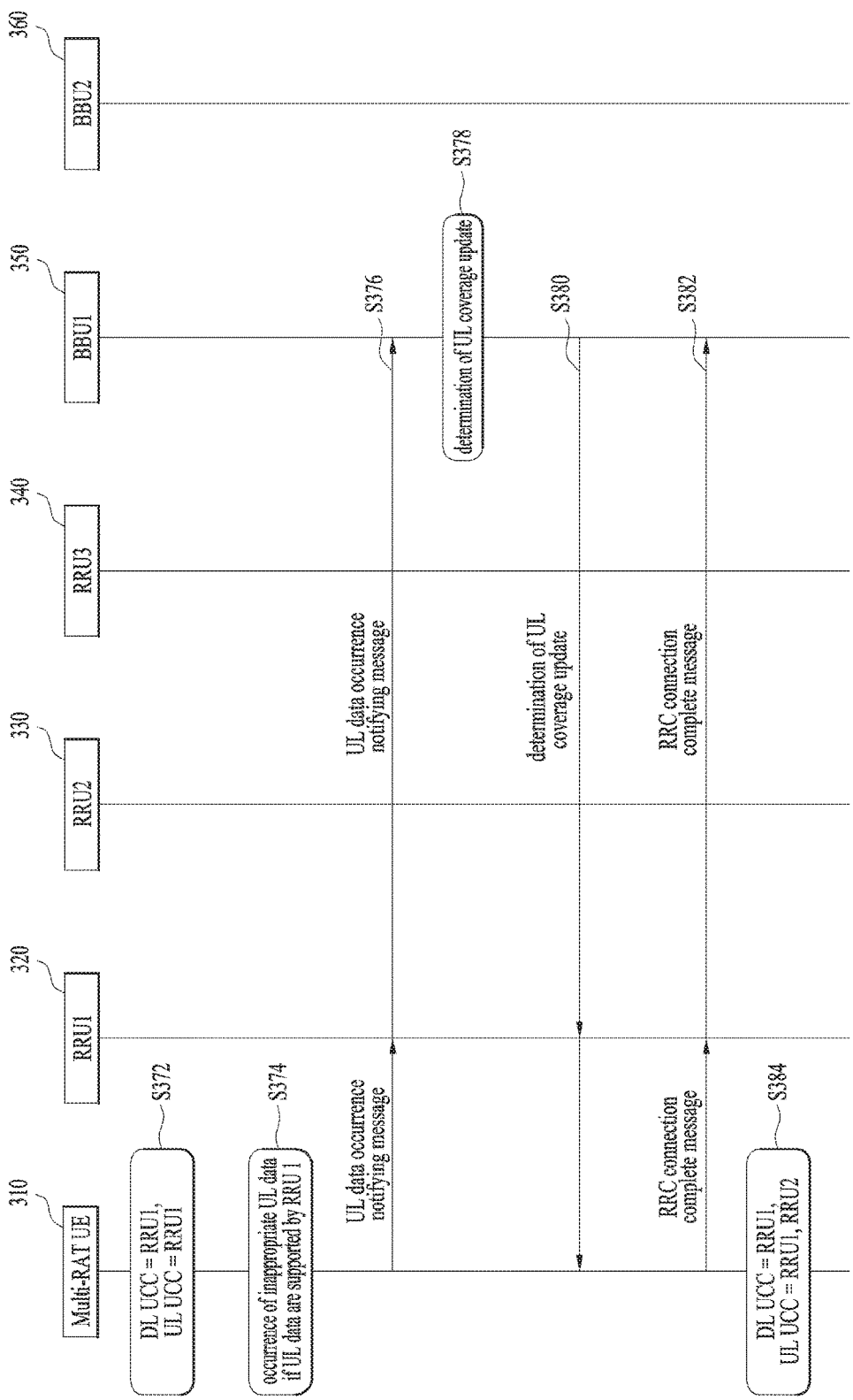
FIG. 3 is a diagram illustrating a method for updating coverage in accordance with one embodiment of the present invention.
Figure 4:
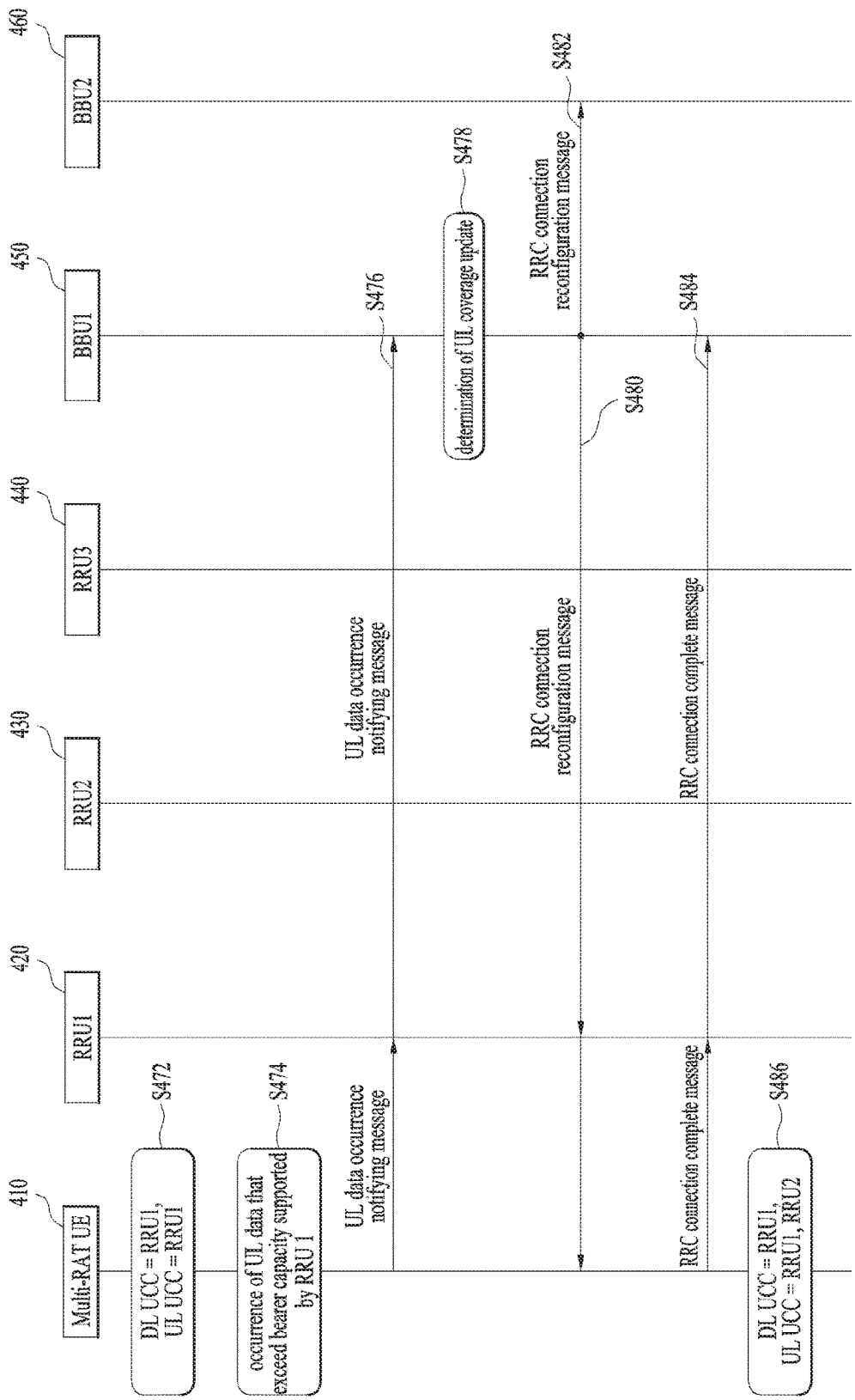
FIG. 4 is a diagram illustrating a method for updating coverage in accordance with another embodiment of the present invention.
Figure 5:
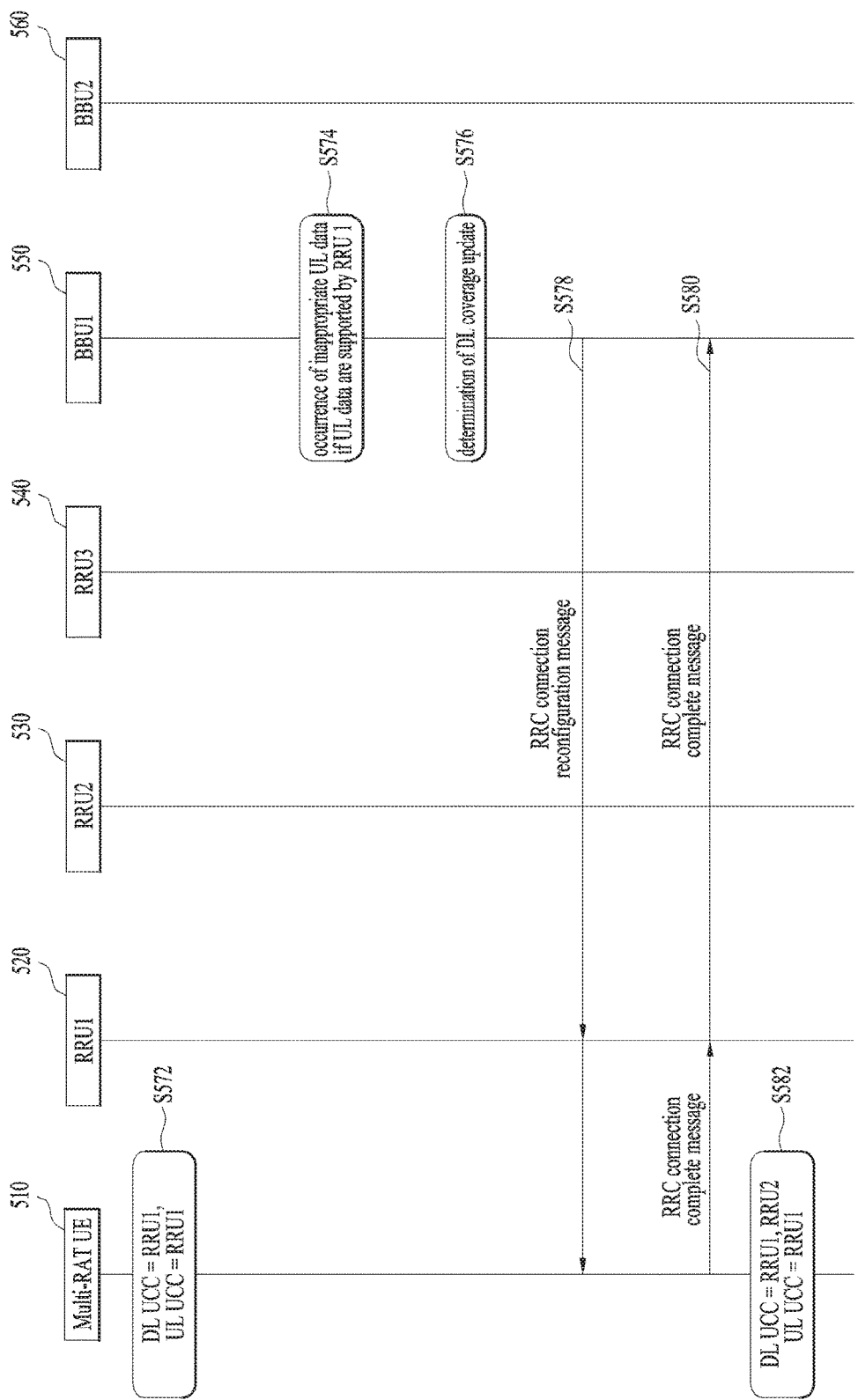
FIG. 5 is a diagram illustrating a method for updating coverage in accordance with still another embodiment of the present invention.
Figure 6:
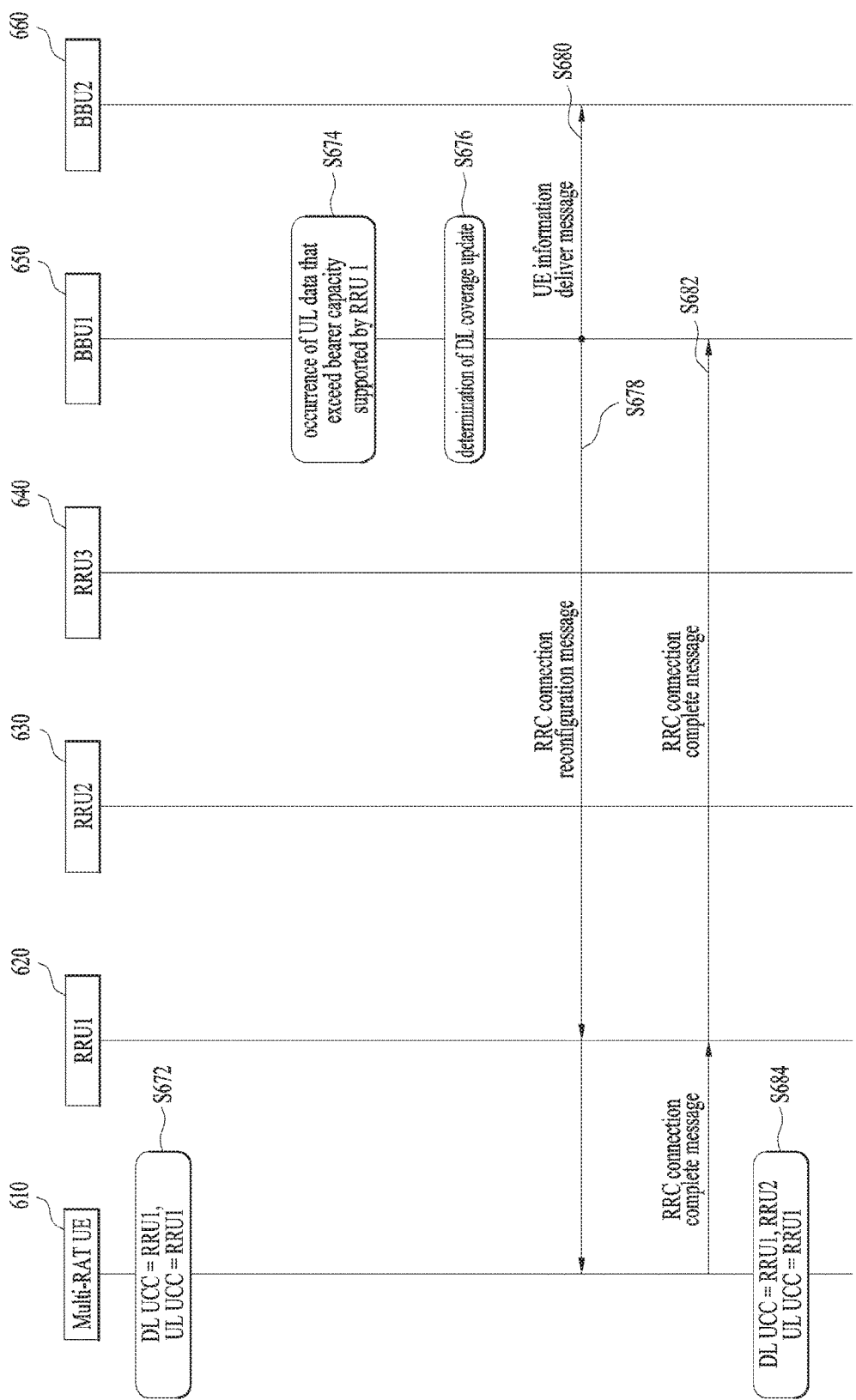
FIG. 6 is a diagram illustrating a method for updating coverage in accordance with further still another embodiment of the present invention.

FIGS. 3 and 4 illustrate an embodiment that uplink coverage is configured for a UE, and FIGS. 5 and 6 illustrate an embodiment that downlink coverage is configured for a UE.

FIG. 3 is a diagram illustrating a method for updating coverage in accordance with one embodiment of the present invention. In the embodiment shown in FIG. 3, a UE 310 is a multi-RAT UE that supports one or more radio access technologies (RAT), and is connected with RRU 1 320 and transmits and receives uplink data and downlink data. That is, the RRU 1 320 supports downlink user centered coverage (UCC) and uplink UCC for the UE 310, and the UE 310 receives a service by being allocated with resources from BBU 1 350 mapped with the RRU 1 320. Hereinafter, the expression that 'a specific RRU supports UCC of the UE' means that the UE is connected with a corresponding RRU and configures UE-centered coverage. That is, in FIG. 3, the UE 310 is connected with the RRU 1 320 in both of a downlink and an uplink and configures UE-centered coverage to receive a service. Meanwhile, the RRU 1 320 is associated with the BBU 1 350, and supports an operation of the UE 310 (S372).

First of all, in FIG. 3, BBU 1 350 and BBU 2 360 belong to one BBU pool and thus may know their load statuses (for example, hardware load, S1 TNL load, load of UE supported by them, load of RRU supported by them, etc.) for each other. Also, the BBU 1 350 and the BBU 2 360 may know their available resource statuses (information on radio resource available status, etc.) for each other. This information may be exchanged through an interface (for example, X2 interface or X2 similar interface) between the BBUs within the BBU pool.

In FIG. 3, the UE 310 is the state that it does not move, that is, has minimum mobility. Also, although not shown in FIG. 3 explicitly, the UE 310 may identify the presence of RRU 2 330 and RRU 3 340 which are RRUs not connected with the UE 310 but located near the UE 310, through periodic measurement. The RRU 2 330 and the RRU 3 340 which are neighboring RRUs detected by the UE 310 may be RRUs that transmit a downlink signal at certain strength or more. That is, the UE 310 may detect its neighboring RRUs by receiving the downlink signal at certain strength or more.

Meanwhile, the UE 310 detects occurrence of uplink data to be transmitted (S374). In the embodiment of FIG. 3, when the uplink data are supported by the RRU 1 320 to which the UE 310 is currently connected, the uplink data are not appropriate. The inappropriate data may mean data which are not supported by the RAT of the RRU 1 320. That is, RAT that may be supported by each of the RRUs is restrictive. For example, the RRU 1 320 to which the UE 310 is connected supports the LTE system, whereas uplink data to be transmitted by the UE 310 may be data transmitted by the Wi-Fi system. In this case, the uplink data to be transmitted by the UE 310 cannot be supported by the RRU 1 320, whereby the UE 310 centered new uplink coverage configuration is required.

Alternatively, the expression that the uplink data are not appropriate when the uplink data are supported by RAT of the RRU 1 320 may mean that it is determined that transmission efficiency through the RRU 1 320 is low. That is, when specific data traffic is supported by specific RAT, transmission efficiency may be high. Therefore, the uplink data detected by the UE 310 are supported by the RRU 1 320, it may be determined that transmission efficiency is low. In this case, the uplink data may be transmitted at relatively high efficiency when the uplink data are supported by RRU that supports another RAT.

If uplink data that cannot be supported by RRU to which the UE 310 is connected (S374), the UE 310 transmits a UL data occurrence notifying message (S376). The UL data occurrence notifying message includes a buffer status report (BSR) message or a non access stratum (NAS) message, which indicates occurrence of the uplink data, and may include RAT information matched with traffic attributes of the corresponding uplink data. The RAT information is information indicating RAT to be supported by RRU which will be newly connected in accordance with the type of the uplink data as described above.

Meanwhile, the UL data occurrence notifying message may include at least one of BSR message, NAS message and RAT information. In other words, the RAT information determined in accordance with the type of the UL data may be transmitted independently, or may be transmitted together with BSR message or NAS message. Alternatively, the RAT information may be transmitted together with another type UL data indicator.

The BBU 1 350 may know the type of the uplink data, which will be transmitted from the UE, in any case of the aforementioned cases. That is, the BBU 1 350 may know traffic attributes of the uplink data even though the UE 310 implicitly transmits the BSR or NAS message only instead of the RAT information. This is because that the BBU 1 350 has the same QCI-RAT mapping table as that of the UE 310.

This information on mapping relation may be transmitted to the UE after being determined by the BBU 1 350, and includes information as to RAT which should be supported in accordance with traffic attributes of each data. The QCI (QoS Class Identifier)-RAT mapping table may be determined by being extracted from a periodic statistical value as to data of traffic attributes preferred by each UE or for data use of UEs. Also, the mapping table which is information on QCI-RAT mapping relation may be UE dedicated information. Alternatively, the QCI-RAT mapping table may be generated by a core network entity on a network, for example, a mobility management entity (MME). If the QCI-RAT mapping table is generated by a separate entity, the MME may manage the QCI-RAT mapping table and transmit the QCI-RAT mapping table to the BBU and the UE.

As described above, the UL data occurrence notifying message transmitted from the UE 310 is transmitted to the RRU 1 320 connected to the UE 310, and the RRU 1 320 delivers the UL data occurrence notifying message to the BBU 1 350 which is RRU operated in association with the RRU 1 320 (S376).

Subsequently, the BBU 1 350 that has received the UL data occurrence notifying message recognizes the need to update uplink coverage of the UE 310, that is, the need to newly configure the UE 310 centered uplink coverage (S378). Subsequently, the BBU 1 350 selects RRU that supports RAT matched with the uplink data transmitted from the UE 310. The RRU that selects the BBU 1 350 may be determined with reference to the measurement result (for example, RRU 2 330 or RRU 3 340) recently reported by the UE 310, and an optimal RRU which is the most suitable for supporting the UE 310 may be selected. The reference suitable for supporting the UE 310 may be determined based on RSSI value to the UE 310.

If the BBU 1 350 determines to use the RRU 2 330 for new uplink coverage for the UE 310, the BBU 1 350 transmits an RRC connection reconfiguration message for the RRU 2 330 to the UE 310 (S380). The RRC connection reconfiguration message may be transmitted to the UE 310 through the RRU 1 320 which is RRU for supporting DL UCC connected to the UE 310. The RRC connection reconfiguration message may include information on RAT supported by the RRU 2 330, that is, information on traffic attributes of uplink data that can be supported by the RRU 2 330 together with information instructing the UE 310 to add connection with the RRU 2 330. Also, the RRC connection reconfiguration message may include attribute (for example, UL or DL) information on the RRU 2 330 which is newly added RRU.

Although not shown explicitly, the BBU 1 350 may transmit additional measurement configuration message to the UE 310 after transmitting the RRC connection reconfiguration message. The additionally measurement configuration message may be a message that includes information instructing the UE 310 to measure a channel quality indicator (CQI), a precoding matrix indicator (PMI), and a rank indicator (RI) for the RRU 2 330, which are additionally allocated. The additional measurement configuration message may be provided to be included in the RRC connection reconfiguration message. That is, a message indicating additional measurement of the RRU 2 330 may be transmitted by being included in the RRC connection reconfiguration message together with the aforementioned information, or may be transmitted in an independent message type.

If the RRC connection reconfiguration message is received, the UE 310 configures connection with the RRU 2 330 and forms new uplink coverage. That is, the UE 310 updates uplink coverage and downlink coverage, which are comprised of RRU 2 320 only, and adds the RRU 2 330 as new uplink coverage. Subsequently, the UE 310 transmits RRC connection complete message indicating that connection with the RRU 2 330 has been established, to the BBU 1 350 in response to the RRC connection reconfiguration message (S382).

The UE 310 may transmit the uplink data through uplink coverage newly formed in accordance with the RRU 2 330 (S384). Also, the UE 310 may not release connection with the RRU 1 320 for transmission of the uplink data supported by the RRU 1 320 even though uplink connection with the RRU 2 330 is additionally provided. That is, since the UE 310 supports multi-RAT, the UE 310 may transmit the uplink data by selectively using connections with the RRU 1 320 and the RRU 2 330.

FIG. 4 is a diagram illustrating a method for updating coverage in accordance with another embodiment of the present invention. In the embodiment shown in FIG. 4, unlike FIG. 3, an RRU 2 430 forming coverage newly added to a UE 410 is operated in association with a BBU 2 460 not a BBU 1 450. Although not mentioned in FIG. 4 explicitly, the description mentioned in FIG. 3 may be applied to FIG. 4 equally or similarly.

In the embodiment shown in FIG. 4, the UE 410 which supports a multi-RAT receives a service through downlink UCC and uplink UCC, which are supported by the RRU 1 420 (S472). The RRU 1 420 is operated in association with the BBU 1 450, and the RRU 2 430 and the RRU 3 440, which transmit a downlink signal of certain strength of more to the UE 410, are operated in association with the BBU 2 460.

Subsequently, the UE 410 detects occurrence of uplink data. The uplink data may be data based on RAT which is not supported by the RRU 1 420, similarly to the case of FIG. 3, or may be data of low efficiency if the data are supported by the RRU 1 420. Also, the uplink data may be data that exceed bearer capacity which is supported by the RRU 1 420 as shown in FIG. 4. In both two cases, the UE 410 recognizes the need to form new uplink coverage (S474).

The UE 410 transmits the UL data occurrence notifying message to the RRU 1 420, and the RRU 1 420 delivers the corresponding message to the BBU 1 450 which is BBU connected with the RRU 1 420 (S476). The BBU 1 450 that has received the UL data occurrence notifying message transmitted from the UE 410 determines to update uplink coverage of the UE 410 (S478). The BBU 1 450 previously acquires information on the RRU 2 430 and the RRU 3 440, which may provide radio quality of a predetermined level or more to the UE 410, from a measurement report message received from the UE 410. Therefore, the BBU 1 450 determines the RRU 2 430 as an entity of new uplink coverage, which will be connected with the UE 410, based on which one of the RRU 2 430 and the RRU 3 440 may provide an optimal service to the UE 410.

Meanwhile, the RRU 2 430 is operated in association with the BBU 2 460, which is another BBU belonging to the same BBU pool as that of the BBU 1 450, not the BBU 1 450 which is BBU that determines to update coverage of the UE 410. That is, in FIG. 3, the RRU 2 330 is operated in association with the BBU 1 350, whereby the BBU 1 350 may directly configure connection with the RRU 2 330 in the UE 310. However, the RRU 2 430 in FIG. 4 is operated by being connected with the BBU 2 460, and the BBU 1 450 needs to notify the UE 410 that the RRU 2 430 newly connected to the UE 410 is operated in association with the BBU 2 460 which is another BBU not the BBU 1 450.

Therefore, the BBU 1 450 transmits the RRC connection reconfiguration message to the UE 410 (S480), and RRC connection reconfiguration message may additionally include information on the BBU associated with the RRU 2 430 in addition to the description in FIG. 3. That is, the RRC connection reconfiguration message may include information on the BBU 2 460 mapped with the RRU 2 430 and attribute information on the RRU 2 430 in addition to the information instructing the UE 410 to add connection with the RRU 2 430 and the information on RAT supported by the RRU 2 430. Also, the RRC connection reconfiguration message may be embodied to include the additional measurement configuration message described in FIG. 3.

Meanwhile, the BBU 1 450 transmits information on the UE 410 to the BBU 2 460 which newly supports the UE 410 through the RRU 2 430 (S482). This procedure may be performed by transmitting a UE information deliver message. That is, the BBU 1 450 transmits the UE information deliver message to the BBU 2 460, and the UE information deliver message may include ID (for example, C-RNTI, etc.) of the UE, context information (information indicating that uplink coverage is newly configured) of the UE, etc.

Subsequently, the UE 410 adds connection with the RRU 2 430 which is a new RRU, and transmits RRC connection complete message to the BBU 1 450 through the RRU 1 420 (S484). Also, the UE 410 may transmit the uplink data to the BBU 2 460 through connection with the RRU 2 430 (S486).

FIG. 5 is a diagram illustrating a method for updating coverage in accordance with still another embodiment of the present invention. In FIGS. 5 and 6, unlike FIGS. 3 and 4, downlink coverage is updated in a UE. Although not described specifically in FIGS. 5 and 6, it is easily noted that the description mentioned in FIGS. 3 and 4 may be applied to FIGS. 5 and 6 similarly.

It is assumed that a UE 510 is connected with an RRU 1 520 and receives uplink and downlink services and the RRU 1 520 is operated in association with the BBU 1 550. The BBU 1 550 that supports the UE 510 detects occurrence of downlink data to be transmitted to the UE 510. Meanwhile, the downlink data may be data which are not supported by the RRU 1 520 that supports DL UCC for the UE 510, or may be data of low efficiency if the data are supported by the RRU 1 520. That is, the BBU 1 550 recognizes the need to add RRU, which supports another RAT not the RAT supported by the RRU 1 520, to the UE 510, and determines to update downlink coverage of the UE 510 (S576).

Meanwhile, the UE 510 measures RRUs that transmit a downlink signal at strength more than a threshold value, and periodically transmits the measured result to the BBU 1 550. Therefore, the BBU 1 550 previously knows that an RRU 2 530 and an RRU 3 540 may provide radio quality of a predetermined level to the UE 510. Therefore, the BBU 1 550 selects RRU, which may provide an optimal downlink service to the UE 510, of the RRU 2 530 and the RRU 3 540. For example, if both the RRU 2 530 and the RRU 3 540 support RAT suitable for downlink data to be transmitted to the UE 510, the BBU 1 550 selects one of the RRU 2 530 and the RRU 3 540, which has the better connection relation with the UE 510. In this embodiment, the case where the RRU 2 530 is selected will be described.

In this selection procedure, the BBU 1 550 has the same QCI-RAT mapping table as that of the UE 510. The QCI-RAT mapping table may be information delivered from an entity (for example, MME) on a network. Therefore, the BBU 1 550 may determine RAT to be additionally configured in the UE 510 to transmit the corresponding data to the UE 510 by identifying traffic attributes of the downlink data to the UE 510.

The BBU 1 550 transmits an RRC connection reconfiguration message to the UE 510 in accordance with the determined result (S578). The RRC connection reconfiguration message may include at least one of information instructing the UE 510 to add downlink connection with the RRU 2 530 and information as to RAT that supports downlink data to be transmitted. Also, the RRC connection reconfiguration message may include information configuring that additional measurement procedure (CQI, PMI, RI, etc.) for the RRU 2 530 will be performed.

Subsequently, the UE 510 transmits RRC connection complete message in response to the RRC connection reconfiguration message (S580), and configures new downlink coverage supported by the RRU 2 530 by adding connection with the RRU 2 530 (S582).

FIG. 6 is a diagram illustrating a method for updating coverage in accordance with further still another embodiment of the present invention. Unlike FIG. 5, FIG. 6 illustrates the embodiment that an RRU 2 630 newly added to a UE 610 is operated in association with a BBU 2 660 not a BBU 1 650.

In FIG. 6, the UE 610 is connected with an RRU 1 620 and receives uplink and downlink services (S672). The BBU 1 650 detects occurrence of downlink data to be transmitted to the UE 610 (S674), and recognizes that transmission of the downlink data to the UE 610 through the RRU 1 620 is not appropriate. There may be various reasons that transmission of the downlink data to the UE 610 through the RRU 1 620 is not appropriate, and there may be a case that the downlink data exceed bearer capacity of the RRU 1 620, which supports the UE 610, as shown, a case that the downlink data cannot be serviced by the RRU 1 620, which supports specific RAT only, or a case that it is determined that efficiency of the downlink data is low if the downlink data are supported by the RRU 1 620.

In any case, the BBU 1 650 determines connection of a new RRU in addition to the RRU 1 620 to the UE 610 for downlink data transmission. That is, the BBU 1 650 determines to update downlink coverage of the UE 610 (S676). The BBU 1 650 selects the RRU 2 630 that may provide an optimal service to the UE 610, and this selection may be determined based on the measurement report message from the UE 610.

Subsequently, the BBU 1 650 transmits an RRC connection reconfiguration message to the UE 610 through the RRU 1 620 (S678). The RRC connection reconfiguration message may include information on the BBU 2 660 which is BBU connected with the RRU 2 630 in addition to information instructing the UE 610 to add connection with the RRU 2 630, information (that is, information on traffic attributes of downlink data to be transmitted from the BBU 1 650) on RAT supported by the RRU 2 630 and attribute information of the RRU 2 630.

Also, the BBU 1 650 transmits UE information deliver message to the BBU 2 660 which is operated in association with the RRU 2 630 (S680). The UE information deliver message may include ID of the UE and context information of the UE, and the BBU 1 650 requests the BBU 2 660 to support the UE 610 through the RRU 2 630 by transmitting the UE information deliver message.

The UE 610 that has received the RRC connection reconfiguration message transmits RRC connection complete message to the BBU 1 650 in response to the RRC connection reconfiguration message (S682). Subsequently, the UE 610 configures new downlink coverage by adding connection with the RRU 2 630, and receives a downlink service through the RRU 1 620 and the RRU 2 630. The UE 610 may release connection with the RRU 1 620 or not as described above.

Figure 7:
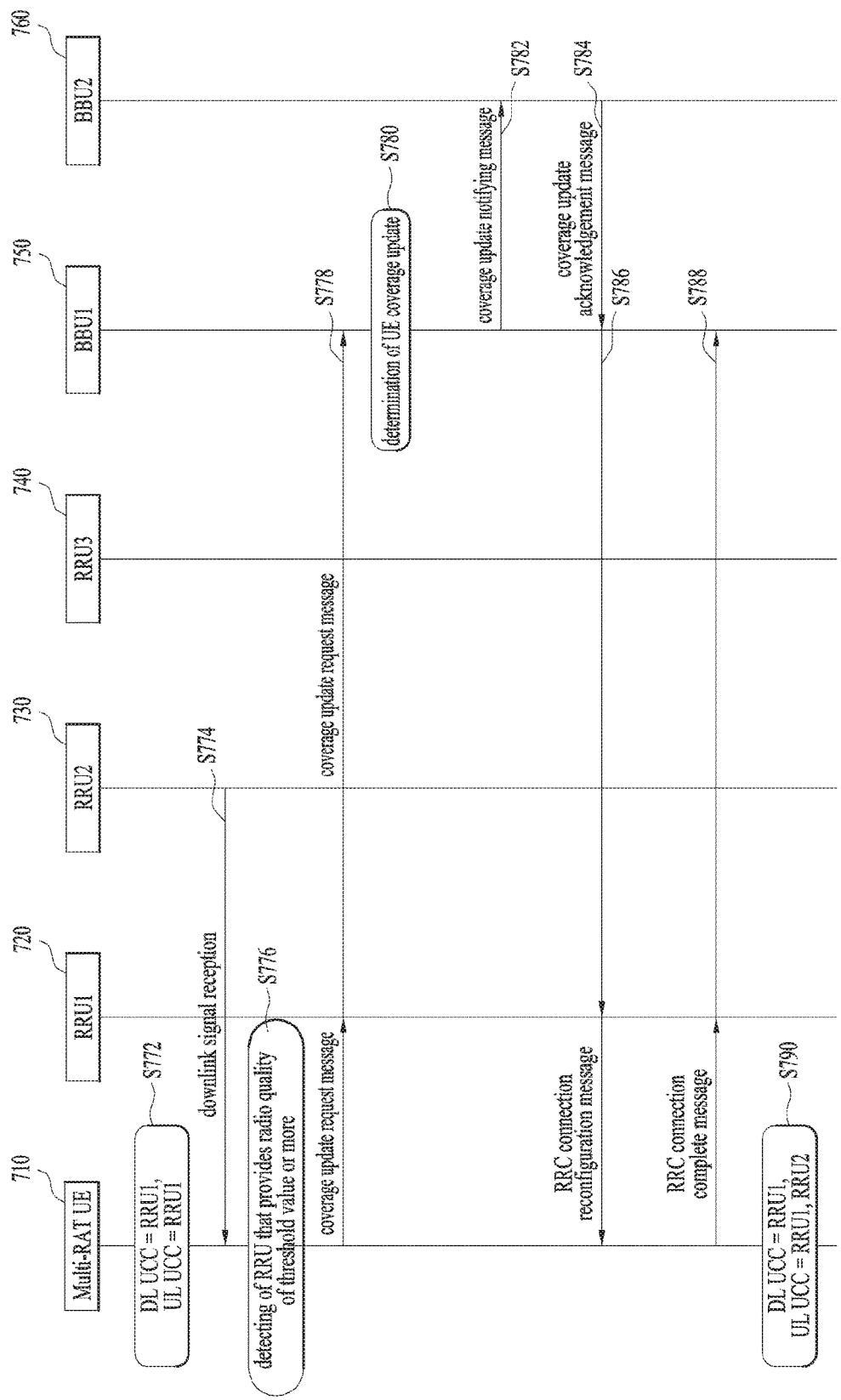
FIG. 7 is a diagram illustrating a method for updating coverage in accordance with further still another embodiment of the present invention.

FIG. 7 is a diagram illustrating a method for updating coverage in accordance with further still another embodiment of the present invention. The embodiments that coverage connected with a UE is configured and updated between BBUs which belong to the same BBU pool have been described as above. However, in the embodiment of FIG. 7, UE centered coverage (UCC) is updated between different BBU pools.

In the embodiment shown in FIG. 7, an RRU 1 720 is operated in association with a BBU pool 1 750, and an RRU 2 730 and an RRU 3 740 are operated in association with a BBU pool 2 760. That is, the RRUs are operated in association with their respective BBU pools. A UE 710 is connected with the RRU 1 720 and configures UE centered coverage (UCC) on a downlink and an uplink to receive a service (that is, RRU 1 720 supports DL UCC and UL UCC for the UE 710).

The UE 710 connected with the RRU 1 720 to receive a service receives a downlink signal at strength of a threshold value or more from the RRU 2 730 (S774), periodically measures the downlink signal and recognizes that the RRU 2 730 may support the UE 710 at radio quality of a predetermined level or more (S776). For example, the UE 710 does not recognize the RRU 3 740 as a candidate RRU which will support the UE 710 if downlink signal strength from the RRU 3 740 is less than a threshold value even though the UE 710 receives the downlink signal from the RRU 2 730 and the RRU 3 740. Meanwhile, the downlink signal transmitted from the RRUs to the UE 710 may include BBU ID of a BBU, to which the RRU is connected, as well as RRU ID of the RRU.

Meanwhile, as the UE 710 recognizes that radio quality from the RRU 2 730 is a predetermined level or more, the UE 710 identifies that the RRU 2 730 may provide radio quality better than that of the RRU 1 720. Therefore, the UE 710 transmits a coverage update request message to a BBU pool 1 750, to which the UE 710 is currently connected, to add connection with the RRU 2 730 (S778). That is, the UE 710 transmits the coverage update request message to a specific BBU included in the BBU pool 1 750 and connected to the RRU 1 720. The coverage update request message may include information requesting the RRU 2 730 to support coverage together with information on the RRU 2 730, which is detected by the UE 710 by receiving a downlink signal at strength of a threshold value or more. Also, the coverage update request message may be delivered through RRC connection, and may be delivered as an NAS type message (for example, a case that the coverage update request message is delivered to MME for paging).

The BBU within the BBU pool 1 750 that has received the coverage update request message determines that the RRU 2 730 should support the UE 710 centered coverage (S780). That is, the BBU that currently supports the UE 710 determines to update coverage of the UE 710. Subsequently, the BBU within the BBU pool 1 750 transmits the coverage update notifying message to a BBU operated in association with the RRU 2 730 within a BBU pool 2 760 (S782).

The coverage update notifying message may include at least one of information on the RRU 2 730, information indicating update of coverage of the UE 710 through the RRU 2 730, ID of the UE, and context information of the UE. In this embodiment, the context information of the UE may include security capability of the UE, access stratum (AS) security information, RRC context information, history information of the UE, etc.

The new BBU within the BBU pool 2 760, which has received the coverage update notifying message, transmits a coverage update acknowledge message which is an acknowledgement (Ack) response or negative acknowledgement (Nack) response of the corresponding request by determining a load status or available resource status of the BBU with which the RRU 2 730 is associated (S784). That is, the new BBU transmits the Ack response if the BBU may support the RRU 2 730 for the UE 710 by accepting the request from the BBU pool 1 750, and transmits the Nack response if the BBU cannot support the UE 710 in accordance with the status within the BBU pool 2 760 in spite of the request.

Meanwhile, it may be considered that the BBU associated with the RRU 2 730 within the BBU pool 2 760 is operated in association with another RRU in addition to the RRU 2 730 and another RRU may support the UE 710. In this case, the BBU pool 2 760 may transmit information on a new RRU not the RRU 2 730 to the BBU pool 1 750 together with transmission of the coverage update acknowledgement message that includes the Nack response.

The BBU pool 1 750 that has received the coverage update acknowledgement message transmits the RRC connection reconfiguration message to the UE 710. The RRC connection reconfiguration message may include at least one of information on the RRU 2 730, information on a new RRU if the information on the new RRU is received from the BBU pool 2 760, information indicating configuration of UE centered coverage through connection with a corresponding RRU, information on a BBU pool with which a newly added RRU is associated, information on a BBU within a BBU pool, and information on attributes of a newly added RRU.

The UE 710 that has received the RRC connection reconfiguration message transmits an RRC connection complete message in response to the RRC connection reconfiguration message (S788), and receives an uplink or downlink service through the UE centered coverage supported by the newly added RRU 2 730. That is, although the RRU 2 730 provides an uplink service in the shown embodiment, the aforementioned procedure may similarly be applied to even the case of the downlink.

4. Apparatuses

Figure 8:
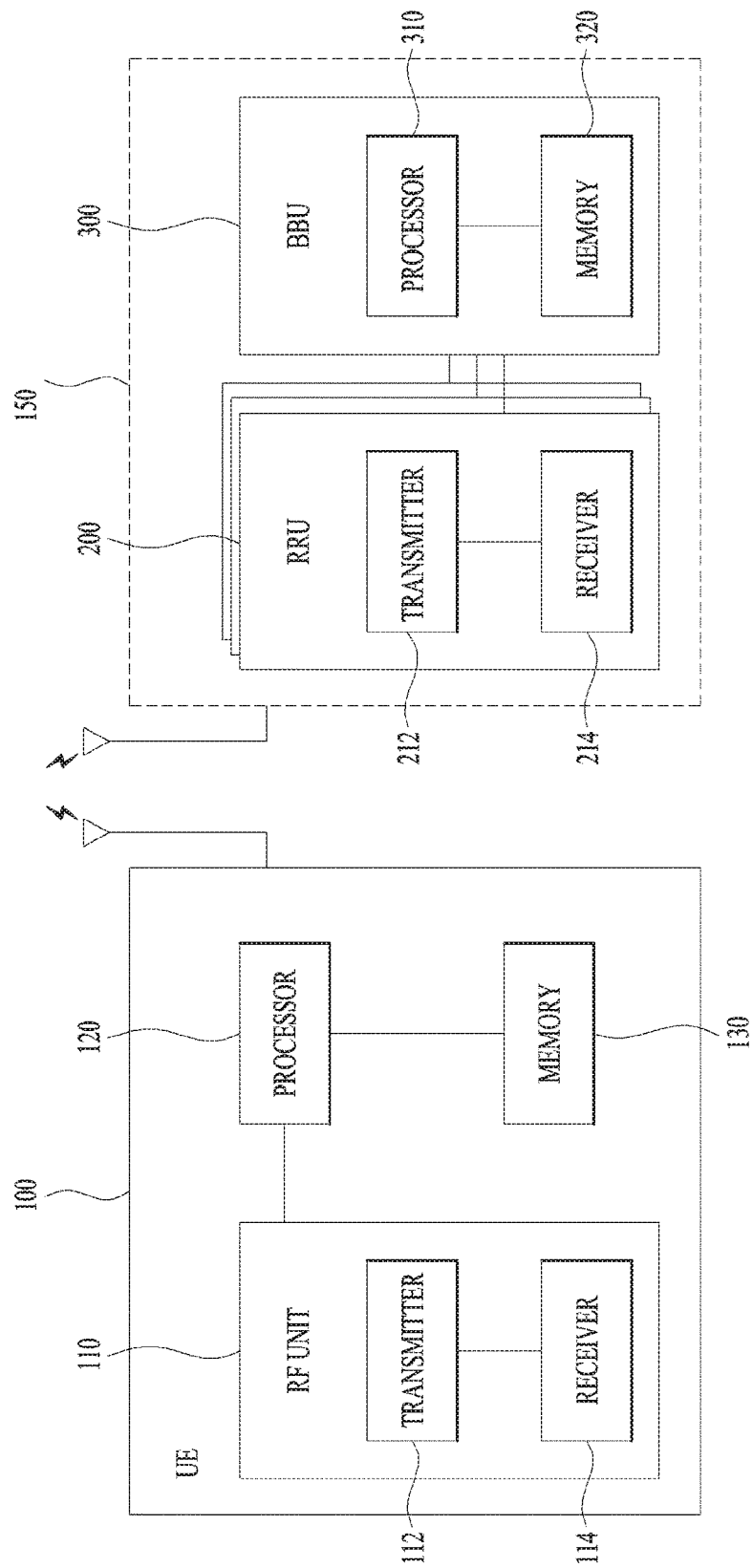
FIG. 8 is a block diagram illustrating a user equipment, RRU and BBU in accordance with one embodiment of the present invention.

FIG. 8 is a block diagram illustrating a user equipment 100, RRU 200 and BBU 300 in accordance with one embodiment of the present invention. Although a 1:1 communication environment between the UE 100 and the RRU 200 is shown in FIG. 8, the communication environment may be configured between a plurality of UEs and the RRU.

In FIG. 8, the UE 100 may include a radio frequency (RF) unit 110, a processor 120, and a memory 130. A conventional eNB 150 may be configured to include a transmitter 212, a receiver 214, a processor 310, and a memory 320. On the other hand, in a cloud-RAN deployment according to an embodiment of the present invention, components included in the conventional eNB 150 may be embodied to be divided into the RRU 200 and the BBU 300.

Thus, the RRU 200 functioning as a simple antenna may include only the transmitter 212 and the receiver 214. An overall communication process such as signal processing, hierarchical processing, etc. is controlled by the processor 310 and the memory 320 included in the BBU 300. Various connection relations such as 1:1, 1:N, M:1, and M:N (M and N are each a natural number) may be established between the RRU 200 and the BBU 300.

The RF unit 110 included in the UE 100 may include a transmitter 112 and a receiver 114. The transmitter 112 and the receiver 114 may be configured to transmit and receive signals to and from the RRU 200. The processor 120 may be functionally connected to the transmitter 112 and the receiver 114 to control a process of transmitting and receiving signals to and from the RRU 200 and other devices by the transmitter 112 and the receiver 114. Also, the processor 120 performs various processing processes on signals to be transmitted and then transmits the processed signals to the transmitter 112 and performs processing on the signals received by the receiver 114.

As necessary, the processor 120 may store information contained in exchanged message in the memory 130. Based on this structure, the UE 100 can perform various methods according to the aforementioned embodiments of the present invention.

The transmitter 212 and the receiver 214 of the RRU 200 may be configured to transmit and receive signals to and from the UE 100. The processor 310 of the BBU 300 connected to the RRU 200 may be functionally connected to the transmitter 212 and the receiver 214 of the RRU 200 to control a process of transmitting and receiving signals to and from other devices by the transmitter 212 and the receiver 214. The processor 310 performs various processing processes on signals to be transmitted and then transmits the processed signals to the transmitter 212 and performs processing on the signals received by the receiver 214. As necessary, the processor 310 may store information contained in exchanged message in the memory 320. Based on this structure, the RRU 200 and the BBU 300 can perform various methods according to the aforementioned embodiments of the present invention.

Each of the processors 120 and 310 of the UE 100 and the BBE 300 requests (e.g., controls, manipulates, manages, etc.) operations of the RRU 200 and the BBU 200, respectively. The processors 120 and 310 may be connected to the memories 130 and 320 for storing program codes and data, respectively. The memories 130 and 320 may be connected to the processors 120 and 310 to store operating system (OS), an application, and general files.

The processors 120 and 310 according to the present invention can also be called a controller, a microcontroller, a microprocessor, a microcomputer, etc. The processors 120 and 310 may be embodied in the form of hardware, firmware, software, or a combination thereof. When an embodiment of the present invention is embodied using hardware, the processors 120 and 310 may include application specific integrated circuits (ASICs), digital signal processors (DSPs), digital signal processing devices (DSPDs), programmable logic devices (PLDs), field programmable gate arrays (FPGAs), or the like which is configured to embody the present invention.

The embodiments of the present invention may be written as computer programs and can be implemented in general-use digital computers that execute the programs using a computer readable recording medium. In addition, a structure of data used in the above-described method may be recorded in a computer readable recording medium through various methods. Program storage devices used for description of a storage device containing an executable computer code for execution of the various methods according to the present invention is not understood as temporary objects such as carrier waves or signals. Examples of the computer readable recording medium include magnetic storage media (e.g., ROMs, floppy disks, hard disks, etc.) and optical recording media (e.g., CD-ROMs, or DVDs).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for updating user equipment (UE)-centered coverage in a cloud radio access network (C-RAN) deployment where a remote radio unit (RRU) and a baseband unit (BBU) are configured separately, the method comprising:
   detecting an occurrence of an uplink data which will be transmitted through an uplink communication;
   transmitting, when the uplink data cannot be transmitted by an RRU connected to a UE due to a state of the RRU, an uplink data occurrence notifying message for requesting an update of an uplink coverage to a BBU mapped with the RRU;
   receiving, from the BBU, a Radio Resource Control (RRC) connection reconfiguration message for indicating an addition of a connection with a new RRU for performing the uplink communication as it is determined that the uplink coverage of the UE is to be updated by the BBU; and
   configuring the connection with the new RRU to transmit the uplink data,
   wherein the state of the RRU includes a case that a radio access technology (RAT) matched with traffic attributes of the uplink data is not supported by the RRU, a case that it is determined that efficiency of a RAT supported by the BBU for the traffic attributes of the uplink data is low, or a case that bearer capacity supported by the RRU is exceeded in accordance with the occurrence of the uplink data.

2. The method according to claim 1, wherein a matching relation between the traffic attributes and the RAT is determined with reference to a mapping table generated by the BBU or a mobility management entity (MME) of a network, the mapping table being generated UE-specifically based on at least one of preference of the UE or a statistic value and transmitted to the UE.

3. The method according to claim 1, wherein the method for configuring a coverage includes:
   periodically receiving downlink signals from RRUs other than the RRU connected to the UE; and
   transmitting, to the BBU, a measurement report message, which includes information on an RRU in which the downlink signal is received at strength of a threshold value or more, among the RRUs other than the RRU connected to the UE.

4. The method according to claim 3, wherein the new RRU is determined based on the measurement report message received by the BBU from the UE, and an RRU, which may provide a best radio quality to the UE, is selected as the new RRU among RRUs detected by the UE.

5. The method according to claim 1, wherein the RRC connection reconfiguration message includes at least one of information on the new RRU, information of RAT supported by the new RRU, attribute information of the new RRU, or information indicating additional measurement of the new RRU.

6. The method according to claim 1, wherein the uplink data occurrence notifying message is embodied by a buffer status report (BSR) message or a non access stratum (NAS) message, and includes information of RAT required for the uplink data.

7. The method according to claim 1, wherein the RRC connection reconfiguration message includes information on a new BBU mapped to the new RRU when the new RRU is not mapped to the BBU which is mapped with the RRU connected to the UE and performs communication with the UE, and the BBU transmits a UE information deliver message, which requests a support of the UE, to the new BBU.

8. A user equipment (UE) for updating UE-centered coverage in a cloud radio access network (C-RAN) deployment where a remote radio unit (RRU) and a baseband unit (BBU) are configured separately, the UE comprising:
 a transmitter;
 a receiver; and
 a processor connected with the transmitter and the receiver and operated to configure the UE-centered coverage,
 wherein the processor detects an occurrence of an uplink data which will be transmitted through an uplink communication, controls the transmitter to transmit when the uplink data cannot be transmitted by an RRU connected to the UE due to a state of the RRU, an uplink data occurrence notifying message for requesting an update of an uplink coverage to a BBU mapped with the RRU, controls the receiver to receive, from the BBU, a Radio Resource Control (RRC) connection reconfiguration message for indicating an addition of a connection with a new RRU for performing the uplink communication as it is determined that the uplink coverage of the UE is to be updated by the BBU, and configures the connection with the new RRU to transmit the uplink data,
 wherein the state of the RRU includes a case that a radio access technology (RAT) matched with traffic attributes of the uplink data is not supported by the RRU, a case that it is determined that efficiency of a RAT supported by the BBU for the traffic attributes of the uplink data is low, or a case that bearer capacity supported by the RRU is exceeded in accordance with the occurrence of the uplink data.

9. A method for updating user equipment (UE)-centered coverage in a cloud radio access network (C-RAN) deployment where a remote radio unit (RRU) and a baseband unit (BBU) are configured separately, the method performed by the BBU and comprising:
 receiving, from a UE, an uplink data occurrence notifying message indicating that an uplink data have occurred but cannot be transmitted through an RRU connected to the UE;
 determining to update an uplink coverage configured for the UE;
 transmitting, to the UE, a Radio Resource Control (RRC) connection reconfiguration message indicating an addition of a connection with a new RRU to allow the UE to transmit the uplink data; and
 receiving an RRC connection complete message in response to the RRC connection reconfiguration message,
 wherein the uplink data occurrence notifying message is received when a radio access technology (RAT) matched with traffic attributes of the uplink data is not supported by the RRU, it is determined that efficiency of a RAT supported by the BBU for the traffic attributes of the uplink data is low, or bearer capacity supported by the RRU is exceeded in accordance with the occurrence of the uplink data.

10. A baseband unit (BBU) for updating user equipment (UE)-centered coverage in a cloud radio access network (C-RAN) deployment where a remote radio unit (RRU) and a BBU are configured separately, the BBU comprising:
 a transmitter;
 a receiver; and
 a processor connected with the transmitter and the receiver and operated to configure the UE-centered coverage,
 wherein the processor controls the receiver to receive, from a UE, an uplink data occurrence notifying message indicating that an uplink data have occurred but cannot be transmitted through an RRU connected to the UE, determines to update an uplink coverage configured for the UE, controls the transmitter to transmit, to the UE, a Radio Resource Control (RRC) connection reconfiguration message indicating an addition of a connection with a new RRU to allow the UE to transmit the uplink data, and controls the receiver to receive an RRC connection complete message in response to the RRC connection reconfiguration message,
 wherein the uplink data occurrence notifying message is received when a radio access technology (RAT) matched with traffic attributes of the uplink data is not supported by the RRU, it is determined that efficiency of a RAT supported by the BBU for the traffic attributes of the uplink data is low, or bearer capacity supported by the RRU is exceeded in accordance with the occurrence of the uplink data.

* * * * *